J. GOOD.
COMBUSTION APPARATUS.
APPLICATION FILED JUNE 6, 1916.
1,334,446.
Patented Mar. 23, 1920.
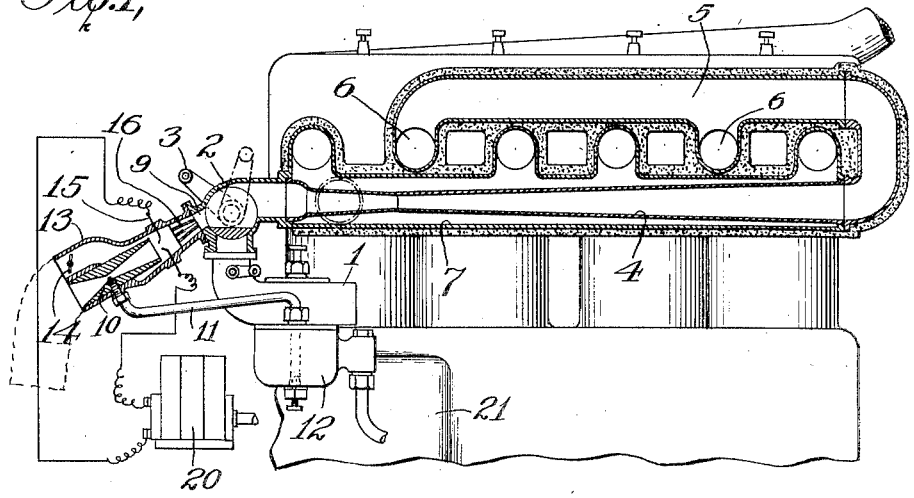
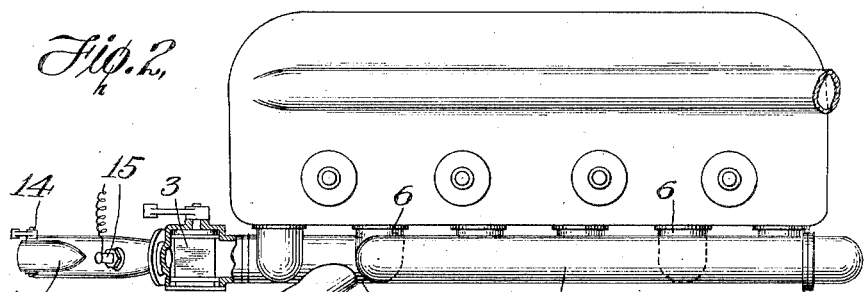
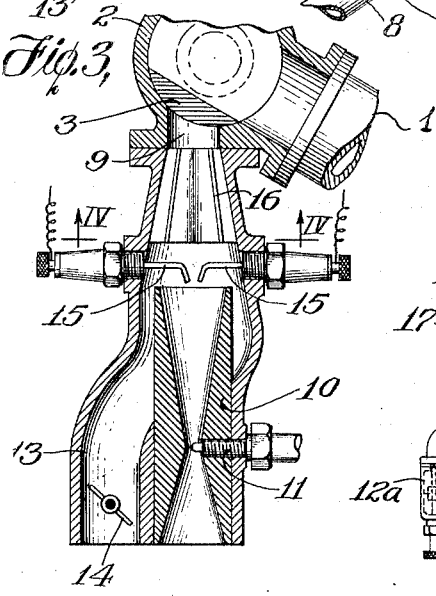
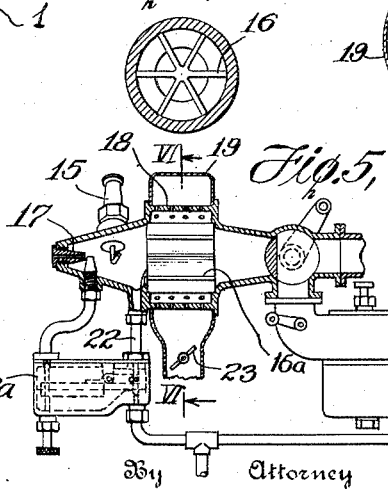
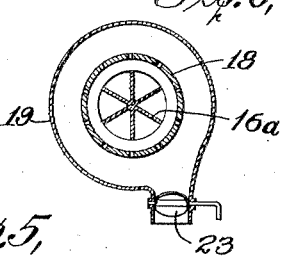
Inventor
John Good

UNITED STATES PATENT OFFICE.

JOHN GOOD, OF BROOKLYN, NEW YORK, ASSIGNOR TO GOOD INVENTIONS CO., OF BROOKLYN, NEW YORK, A CORPORATION OF NEW YORK.

COMBUSTION APPARATUS.

1,334,446.  Specification of Letters Patent.  Patented Mar. 23, 1920.

Application filed June 6, 1916. Serial No. 101,889.

*To all whom it may concern:*

Be it known that I, JOHN GOOD, a citizen of the United States, and a resident of Brooklyn, in the county of Kings and State of New York, have invented the following-described new and useful Improvements in Combustion Apparatus.

The invention is an improved means for heating internal combustion engine vaporizers and other objects and consists of a device supplied with liquid fuel and adapted automatically to establish internal flame and non-explosive combustion under the influence of suction which may be imparted to it by the rotation of the engine on which the device is used.

In the accompanying drawings:

Figure 1 is a longitudinal vertical section through the suction and exhaust headers of a kerosene-burning engine and showing the invention applied thereto.

Fig. 2 is a top plan view of Fig. 1, omitting the lagging on the headers.

Fig. 3 is an enlarged longitudinal section of the burner head;

Fig. 4 a cross-section thereof on line IV—IV of Fig. 3;

Fig. 5 is a modified burner head in longitudinal central section; and

Fig. 6 a cross section thereof.

In the engine shown and in its working process the fuel mixture from the fuel and air proportioner or carbureter 1 is drawn through the elbow connection 2, containing a barrel type switch valve 3, and into a thin venturi-form vaporizer tube 4, which is externally heated by the engine exhaust, and passes from this heated tube to the inlet header 5 and through the latter to the inlet port 6. The exhaust header 7 serving the four exhaust ports shown and surrounding the vaporizer tube, discharges to an off-take 8, and both the headers and their connections are preferably covered with heat-insulating lagging. This type of engine vaporizer is adapted to convert a kerosene mixture into a clean-burning combustion charge under high speed and automobile conditions and forms the subject of a separate application.

The rotary valve member 3 is provided with a handle by which it may be turned to interrupt and close the normal connection of the proportioner 1 with the intake passage and vaporizer 4, and by the same act to open a passage 9 to said intake passage, the said passage 9 being assumed, for the purpose of the present description, to be closed at other times when the valve 3 is in its normal position. The passage 9 thus opened forms the connection to the burner head of the heating apparatus and when the engine is rotated by a crank or its starting motor, atmospheric air is drawn through the burner head and the suction intake, taking the course normally taken by the engine charge mixture and its combustion products. The burner head comprises a spray-producing device in the form of a Venturi tube 10, interposed in said suction flow, having a liquid fuel nozzle 11 opening into its narrow throat and supplied with liquid through a small pipe from the float bowl 12 of the proportioner. The burner, as above stated, operates on the same fuel as used by the engine. The air flow through the Venturi tube 10 creates a local relative vacuum and high velocity at the throat, which serve to lift the fuel from the float bowl and produce a finely atomized spray directed inwardly toward and into the passage 9 and the suction intake. Supplemental combustion-supporting air is at the same time drawn into the burner head through the auxiliary passage 13, joining the spray at or just beyond the end of the tube 10 inside of the burner head but not in such manner as to establish an immediate homogeneous mixture with the spray. The relative quantities of air and fuel so admitted to the burner head are subject to adjustment by the damper valve 14 and are normally so adjusted as to supply the air in explosive proportions with respect to the fuel, *i. e.*, for internal combustion therewith without appreciable excess of air, which results in complete combustion of the fuel within the engine passages. While the proportions are those of an explosive mixture, it is important that homogeneity of mixture be avoided, at least in the proximity of the burner head, as otherwise the effect of the ignition results merely in explosions and not in continued combustion. The fuel spray from the Venturi tube 10 is ignited within the burner head by an electric spark between the electrodes 15 placed at the exit of the tube, as shown, and at a point where the incoming air from the passage 13 does not so completely mingle with the spray as to render it non-ignitible or ignitible only with explosive effect. The terminals of the electrodes are bent convergently toward the spray-producing means, in order that the force of the blast may tend to blow drops of liquid kerosene away from the spark gap to avoid short-circuiting and thereby permit the use of ordinary ignition circuits and current sources. The ignition established by the spark inside of the burner head results in continued combustion extending in and through the intake passage and vaporizer tube, the flame and products of combustion circulating through the engine cylinders and escaping through the header 7 and offtake 8. Thereby the vaporizer tube and the engine parts generally are very promptly heated, so that on a few preliminary revolutions of the engine with the valve 3 open to the burner head, the engine may be started on its regular work. Such preliminary operation of the engine is intended to be accomplished by the self-starting motor now common in automobile and other power plants and indicated generally at 21 in Fig. 1.

The procedure in starting this kerosene engine thus consists merely in closing the battery circuit to the starting motor and opening the switch valve 3 to the burner head, presently opening it to the proportioner, as soon as the engine is hot, and it is obvious that such operation can be carried out as stated, whether the engine is equipped with the special form of vaporizer taken for illustration or some other form, and it will be also apparent that combustion will ensue from suction applied to the burner head by the driven engine acting as a pump, or by any other form of suction-producing apparatus.

While it is not essential, the exhaust valve may be held open during the compression strokes of the engine pistons in order to relieve the compression and thereby avoid undue load on the starting motor. There are many contrivances known to the art for this purpose and for that reason I do not regard it necessary to illustrate the same herein. Suffice it to say that obviously the control of the starting member and switch valve 3 may be subordinated to the operation of a single push button, so that the process of starting the present engine need be no more complicated than the present method of starting automobile engines. Obviously also the current for the igniter electrodes may be taken from the starting batteries, although the present drawing shows the use of the regular ignition magneto 20 for this purpose. It is not necessary to change the circuit connections of the magneto and engine spark plugs when shifting over from the starting to running conditions although that may be done if desired, and by means of switch mechanism applied to and operated by the switch valve 3.

The part marked 16 intervening between the igniter and the flame passage, is a partitioning member of star-shape in cross-section, as shown in the section view, its function being to give direction to the streams of air and fuel spray (ignited) as they enter the flame passage and also to assist in vaporizing such particles of liquid fuel as happen to strike it. Its wing parts are thin and placed edgewise to the flow, but other cell-forming non-baffling members may be inserted in the passage to serve the same purpose.

In the burner head shown by Figs. 5 and 6, which is intended to be connected to the engine intake in the same relation as the burner head above described, the operation is the same in principle as that form. The fuel spray is produced by the atomizing effect of an induced air-jet entering through the nozzle 11, and the supplemental air is admitted through a series of fine holes in the casing wall 18, just forward of the spark plug terminals. The relation of the nozzle air-jet 17 to the combustion supporting air admitted through the perforated wall 18, is such as to establish complete combustion of the fuel as in the form first described. The star-piece partitioning member 16$^a$ is centralized within the perforated wall 18 just in advance of the point of ignition and the spark plugs are mounted in the nozzle cap and intended to be operated as above described. The electrode terminals of these spark plugs should be bent convergently upward, in order to turn liquid away from the spark gap. The fuel nozzle 11 takes its supply in the present case from a float chamber 12$^a$ individual to the burner head, and the surface pressure in said chamber is balanced to the inside of the burner head by an equalizing pipe 22 which is made also as a drainage pipe to return any drip from the nozzle back to the float chamber. To aid in establishing the proportions which will adapt the spray to ignite cold and burn with complete combustion in the intake passage, the fuel nozzle 11 is supplied with a needle valve, and the jacket 19 surrounding the perforated wall 18, is provided with an adjusted inlet valve 23.

Moreover the action of the device is assisted by the shape of the flame space within the burner head which is convergent toward the passage to be heated.

That part of the invention above shown or described, but not herein claimed, involving the relation of the internal flame producing device to the engine structure and its mode of coöperation therewith, forms the subject of my copending application filed February 27, 1917, Ser. No. 149,998.

I claim:

1. The combination of means for creating suction flow through a suction passage including a burner head, a liquid fuel receptacle delivering fuel by suction to the burner head, an air entrance having a suction flow capacity suited for complete combustion within the passage and an igniter operating in the head where the combustible medium is relatively rich in fuel.

2. The combination of a suction passage to be heated provided with suction-operated means for aspirating liquid fuel to create a fuel and air spray therein, a suction inlet to said passage for supporting-air, an igniter intercepting the spray, said spray, supporting air and igniter being mutually related to produce ignition and complete non-explosive combustion within the said passage and means for creating suction flow through the passage.

3. The combination of a suction passage to be heated including a burner head provided with a suction air-nozzle, a nozzle connected to a liquid fuel receptacle and arranged in atomizing relation to said air nozzle, a suction air inlet to said passage having a flow capacity suited to complete the combustion of the fuel therein, and an igniter operating in the head where the combustible medium is relatively rich in fuel, said spray, air current and igniter being mutually organized to produce non-explosive combustion within the passage, and means for creating suction flow through the passage.

4. The combination with a suction passage to be heated, provided with a suction-operated fuel spray inlet, a spark igniter for the spray, a suction-operated air inlet admitting air to said spray in advance of the igniter and in proportion suited to complete the combustion of the spray within the passage and means for creating suction flow into said passage through said inlets.

5. The combination with a suction passage to be heated, of a flame-producing burner head connected thereto and comprising suction-operated liquid fuel spraying means, an igniter, a suction inlet for combustion supporting air surrounding the spraying means and admitting air to said spray where it does not dilute the same at the igniter and in proportion to complete the combustion thereof in said suction passage, and means for creating suction flow through said burner head and passage.

6. The combination of a suction passage to be heated including a suction-operated burner head provided with a fuel spray means, an air inlet and an igniter all automatically coöperating to produce ignition of the fuel in a cold state and complete non-explosive combustion in the suction passage, means for creating suction flow through said passage, and means for operating said igniter, said two means being organized for coincident actuation.

7. The combination of a suction passage including a burner head comprising suction-operated fuel spray means, a casing wall having perforations surrounding the spray and constituting a suction air inlet, an igniter operating where the combustible mixture is relatively rich in fuel, and means for creating suction flow through the passage.

8. The combination with a suction passage to be heated including a flame-producing device comprising liquid fuel spraying means, an electric igniter intercepting the spray, a suction inlet for combustion-supporting air, a cell-form partitioning member at the junction of the spray and the combustion-supporting air and beyond the igniter and means for creating suction flow through said passage.

9. The combination with a suction passage provided with a flame-producing device comprising liquid fuel spray inlet, a suction inlet for combustion-supporting air, a perforated wall surrounding the spray from said inlet and distributing such air into contact with and around the same and means for creating suction flow through said passage, inlets and perforated wall to operate the said flame-producing device.

10. The combination with a passage to be heated of means for creating suction flow through the same, a suction inlet to said passage for combustion-supporting air, a liquid fuel receptacle connected to a suction-operated fuel inlet to said passage and adapted to discharge spray in substantially fixed proportion to the flow through said air inlet, a pressure communication between the interior of said passage and the liquid receptacle and means for igniting the spray to burn in said passage.

11. The combination of a suction passage, a burner head therefor provided with a fuel spray inlet, an igniter for the spray and an inlet for combustion-supporting air and also containing a cylindrical wall member surrounding the spray beyond the igniter and spaced from the exterior wall of the burner head, and means for creating suction flow through said inlets.

12. The combination of a suction passage, a burner head provided with a fuel spray inlet supplied from a liquid receptacle, the interior of which is maintained at the same suction pressure as the interior of the burner head, an electric igniter for the spray in said head, an inlet thereto for combustion-supporting air, and a drain from the burner head to said receptacle.

13. The combination of a suction passage, a burner head therefor provided with a fuel spray inlet, an igniter for the spray, an inlet for combustion supporting air and a cylindrical wall member surrounding the spray beyond the igniter and spaced from the exterior wall of the burner head, the said fuel spray inlet being supplied from a liquid receptacle, the interior of which is maintained at the same suction pressure as the interior of the burner head, and a drain from the burner head to said receptacle.

14. The combination of a suction passage to be heated, a burner head connected therewith and operated by the suction therein and containing a fuel spray inlet, an air inlet and an electric igniter, the flame space within the burner head being convergent toward the passage to be heated.

15. The combination of a suction passage to be heated including a suction-operated burner head provided with a fuel spray means, an air inlet and an igniter all automatically coöperating to produce ignition of the fuel in a cold state and complete non-explosive combustion in the suction passage, means for creating suction flow through said passage, means for operating said igniter, said two last mentioned means being organized for coincident actuation and a valve controlling said air inlet.

In testimony whereof I have signed this specification.

JOHN GOOD.